United States Patent [19]

Meredith

[11] Patent Number: 4,778,190

[45] Date of Patent: Oct. 18, 1988

[54] REMOVABLE SKI ATTACHMENT FOR A WHEELED VEHICLE

[76] Inventor: John Meredith, 30 Livonia Place, Apt. 506, West Hill, Ontario, Canada, M1E 4W7

[21] Appl. No.: 933,665

[22] Filed: Nov. 21, 1986

[51] Int. Cl.[4] ............................................. B62B 13/18
[52] U.S. Cl. .................................... 280/7.12; 280/8; 280/13
[58] Field of Search ................... 280/7.12, 8, 10, 13, 280/47.26, 652, DIG. 3, 11, 14

[56] References Cited

U.S. PATENT DOCUMENTS

| | | | |
|---|---|---|---|
| 1,406,207 | 2/1922 | Miller | 280/13 |
| 3,845,967 | 11/1974 | O'Brien et al. | 280/14 |
| 4,163,564 | 8/1979 | Kramer | 280/10 |
| 4,589,668 | 5/1986 | Mares | 280/8 |

FOREIGN PATENT DOCUMENTS

| | | | |
|---|---|---|---|
| 817300 | 7/1969 | Canada | 280/13 |
| 32313 | 5/1921 | Norway | 280/13 |
| 117679 | 11/1946 | Sweden | 280/8 |
| 223676 | 12/1942 | Switzerland | 280/10 |

*Primary Examiner*—John J. Love
*Assistant Examiner*—Brian L. Johnson

*Attorney, Agent, or Firm*—Arne I. Fors; Robert F. Delbridge

[57] ABSTRACT

A ski attachment for pivotal attachment to the axle or transverse rod-like member of a wheeled vehicle which comprises at least one ski having an elongated runner with an upturned front tip, an upstanding pedestal mounting on said elongated runner behind said front tip, said pedestal having an upper distal end with a transverse recess or like means formed therein for pivotally receiving said transverse axle or rod-like member of the vehicle, said pedestal and ski having a total height greater than the radius of the vehicle wheel, and tension biasing means interconnecting the front tip of the ski to the vehicle above the axle for urging the front end of the ski upwardly relative to the vehicle whereby the mounting of obstacles during forward travel of the vehicle is facilitated. In a preferred aspect, the ski attachment of the invention comprises a pair of skis, with means for securing the skis together in spaced side-by-side relationship. Each of the skis preferably has a runner comprising an elongated base upturned at its front and rear ends with a pair of spaced-apart sidewalls extending from the front end to the rear end, an upstanding pedestal mounted on the base between the sidewalls and secured to the sidewalls, and at least one transverse member interconnecting the skis together a spaced distance apart.

1 Claim, 2 Drawing Sheets

REMOVABLE SKI ATTACHMENT FOR A WHEELED VEHICLE

BACKGROUND OF THE INVENTION

This invention relates to a ski attachment and, more particularly, relates to a ski attachment for use on wheeled vehicles such as the bundle buggies and baby carriages.

Bundle buggies, for example, when loaded with groceries, may be difficult to push or pull through a layer of snow on the ground because of the usual small diameter and narrow tire width of the wheels on this type of vehicle.

Canadian Pat. No. 817,300 issued July 8, 1969 discloses a ski attachment for individual wheels of a bundle buggy or baby carriage. The attachment of the individual skis to the wheels may be somewhat difficult for users who may have a disability such as arthritis and it is, therefore, a principal object of the present invention to provide a simplified ski attachment which can more easily be secured to or detached from a wheeled vehicle.

SUMMARY OF THE INVENTION

In its broad aspect, the ski attachment of the present invention comprises a ski for pivotal attachment to the axle or transverse rod-like member of a wheeled vehicle, said ski having an elongated runner with an upturned front tip, an upstanding pedestal mounting on said elongated runner behind said front tip, said pedestal having an upper distal end with a transverse recess or like means formed therein for pivotally receiving the said transverse axle or rod-like member of the vehicle, said pedestal and ski having a total height greater than the radius of the vehicle wheel, and tension biasing means interconnecting the front tip of the ski to the vehicle above the axle for urging the front end of the ski upwardly relative to the vehicle whereby the mounting of obstacles during forward travel of the vehicle is facilitated.

In a preferred aspect, the ski attachment of the invention comprises a pair of skis, means for securing the skis together in spaced side-by-side relationship, each of said skis having an upstanding pedestal mounted on the runner behind the front tip, each of said pedestals having a distal end with a transverse recess in alignment with each other for pivotally receiving said transverse axle or rod-like member of the vehicle, and tension biasing means interconnecting the front tips of the skis to the vehicle above the axle for urging the front ends of the skis upwardly relative to the vehicle.

Each of the skis preferably has a runner comprising an elongated base upturned at its front and rear ends with a pair of spaced-apart sidewalls extending from the front end to the rear end, an upstanding pedestal mounted on the base between the sidewalls and secured to the sidewalls, and at least one transverse member interconnecting the skis together a spaced distance apart. Said transverse member may interconnect the pedestals and/or the runners to maintain the skis in a parallel spaced relationship to each other.

BRIEF DESCRIPTION OF THE DRAWINGS

The ski attachment of the invention will now be described in detail with reference to the accompanying drawings, in which.

DESCRIPTION OF THE PREFERRED EMBODIMENT

Figure 1:
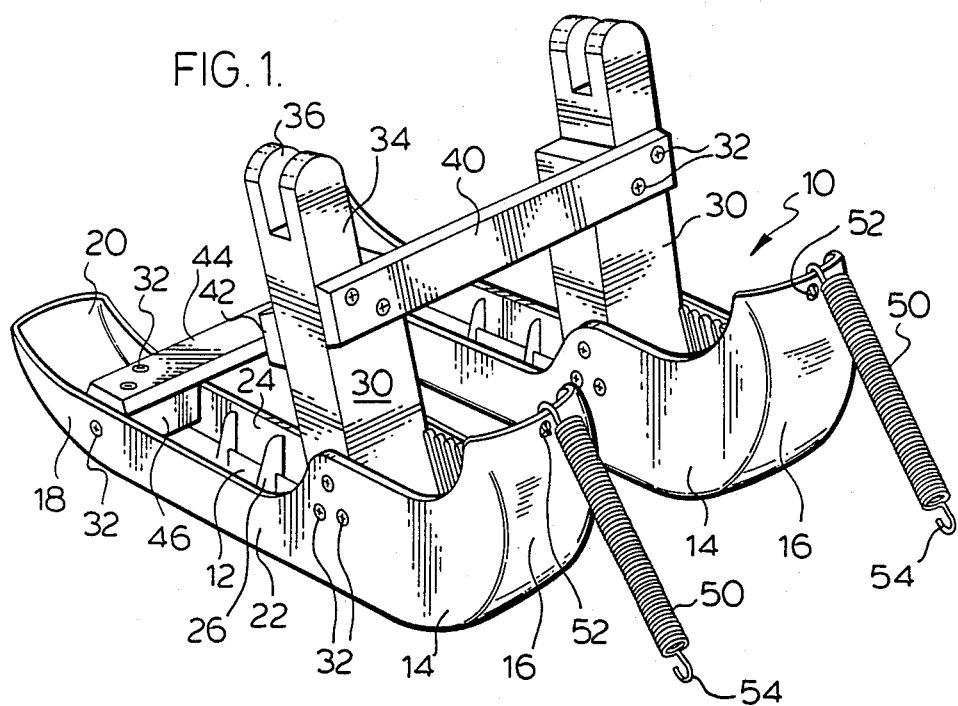
FIG. 1 is a perspective view of a preferred embodiment of my invention.

With reference to the drawings, each ski 10 comprises an elongated base 12 having a front end 14 upturned with tip 16 and rear end 18 with upturned tip 20. Spaced-apart sidewalls 22, 24 extend from tip 16 to tip 20. The skis can be formed of a plastics material by, for example, injection moulding, or from sheet metal such as sheet aluminium or sheet steel by bending into the configuration illustrated. Gussets 26 may be desired in the plastics embodiment to reinforce the sidewalls 22, 24.

Figure 3:
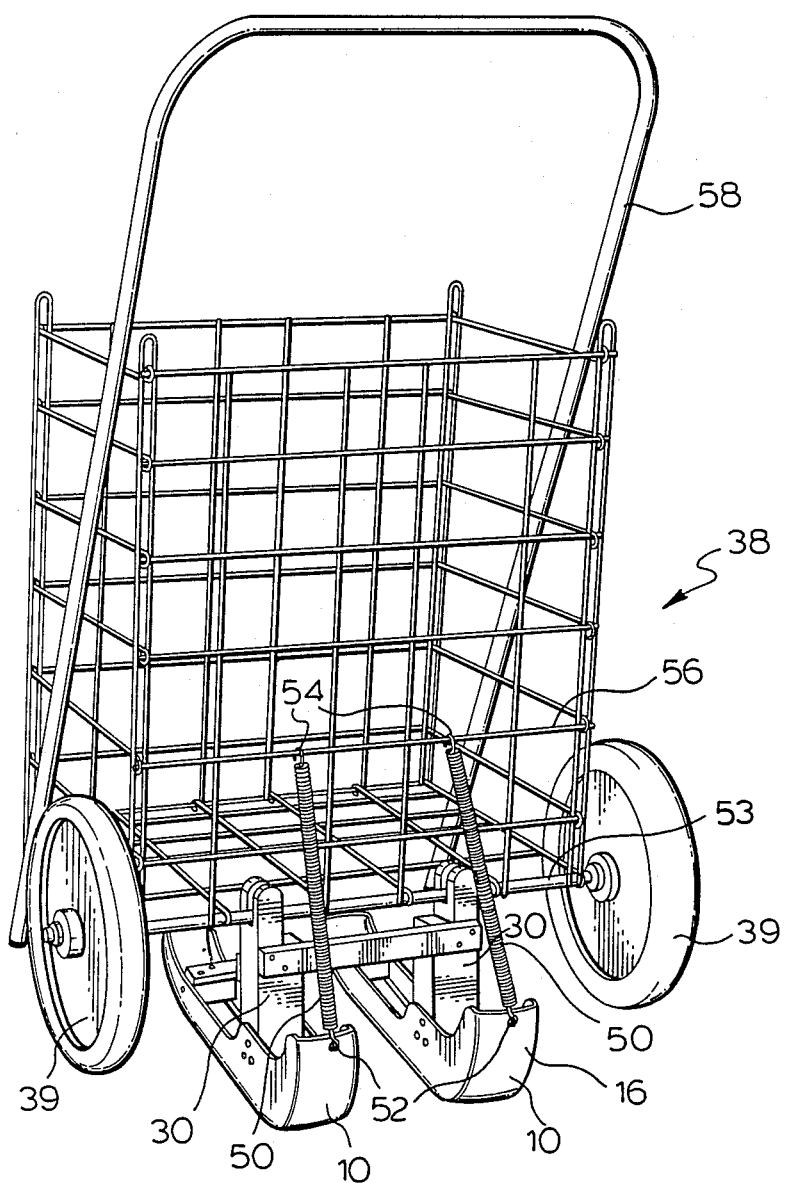
FIG. 3 is a perspective view of the said ski attachment in use with a bundle buggy.

A pedestal 30 is mounted on each ski behind the tips 16 between sidewalls 22, 24, usually on base 12 and secured thereto by connectors such as screws or rivets 32. The upper distal end 34 of each pedestal has a transverse slot 36 formed therein in alignment with each other for pivotally receiving the axle or like transverse rod member at the bottom of the vehicle 38, as shown in FIG. 3. Each Pedestal 30 and ski 10 have a total height greater than the radius of wheels 39 such that the wheels are lifted clear of the ground surface when the skis are attached.

Pedestals 30 are interconnected by a transverse member 40 secured thereto by connectors such as screws or rivets 32. A second transverse member 42, shown secured to the rear surface of pedestal 30, and a third transverse member 44, shown mounted on a block 46 secured between sidewalls 22, 24 on each ski by connectors 32, may be provided for additional strength and rigidity.

Tension springs 50 are mounted in openings 52 formed in the tips 16 at the front ends 14 of the skis.

Figure 2:
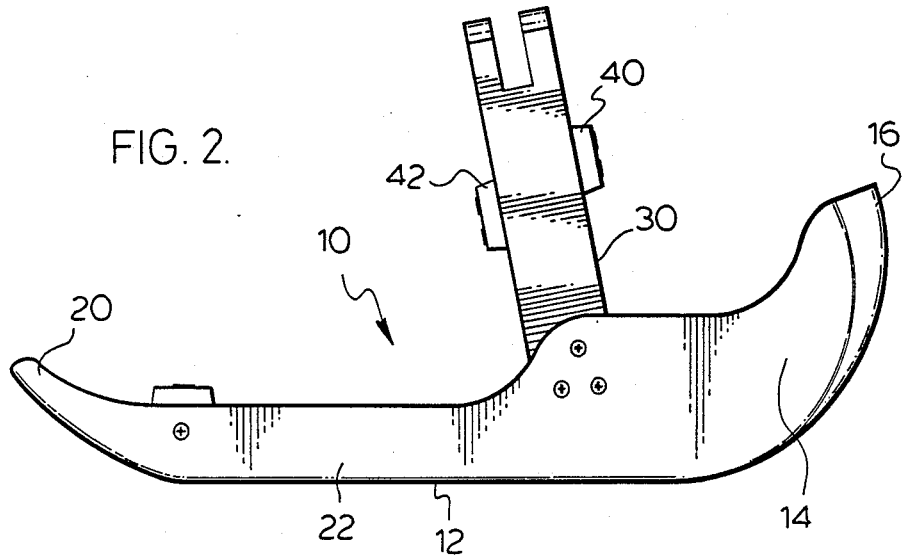
FIG. 2 is a side elevation of the ski attachment shown in FIG. 1.

In use, the axle or transverse rod-like member 53 of a vehicle is seated in recesses 36 and the free ends 54 of springs 50 are secured to the front of the vehicle above the axle such as by securement to transverse wire member 56 whereby the skis are operatively attached to the bundle buggy and the front ends 14 of the skis 10 are urged to pivot upwardly (counter clockwise as viewed in FIGS. 2 and 3). The collective tension force of springs 50 is less than the weight of vehicle 38 such that the skis 10 normally remain in a horizontal, grounded-engaging position, as illustrated in FIG. 3. Upon encountering an obstacle, such as a curb, a forward and upward pull on handle 58 of vehicle 38 causes the upturned front tips 16 of skis 10 to pivot upwardly to mount and climb over the curb.

In one embodiment of my invention, a ski shell having a length of about 15" with a width of about 2" comprises base 12 and sidewalls 22, 24 formed of Dupont (TM) SKLAR by injection moulding. Pedestals 30 formed also by injection moulding of the same plastics material have a height of about 7½" which lifts 9½" diameter wheels 2" above the ground and 7½" diameter wheels 3" above the ground. The skis are joined by lateral transverse members 40, 42 and 44 formed in like manner of a plastics material and having a length of about 9". Tension springs 50 having a length of about 5" have been found satisfactory for pivotally securing the skis to a bundle buggy.

Although the description has proceeded with reference to the use a pair of spaced-apart parallel skis, it will be understood that one or more skis is contemplated depending on the size of the wheeled vehicle, and width of the ski runner.

I claim:

1. A ski attachment for pivotal securement to the axle or transverse rod-like member of a bundle buggy having a pair of spaced-apart wheels mounted on said axle or rod-like member comprising, in combination, a pair of skis, means for securing the skis together in a spaced side-by-side relationship, each of said skis having an elongated runner with upturned front and rear tips, spaced-apart upstanding sidewalls extending from said front to said rear tips and an upstanding pedestal mounted on the runner behind said front tip secured to the sidewalls, each of said pedestals having a distal end with a transverse recess in alignment with each other for pivotally receiving said axle or transverse rod-like member of the bundle buggy between the spaced-apart wheels, said means for securing the skis together including a first transverse member secured to and interconnecting the pedestals and a second transverse member secured to and interconnecting the skis behind the pedestals, said pedestals and skis having a total height greater than the radius of the bundle buggy wheels for normally lifting the bundle buggy wheels off the ground, and a tension spring connected to each front tip of each ski for interconnecting each of the front tips of the skis to the bundle buggy above and in front of the axle or rod-like member for urging the front ends of the skis upwardly relative the bundle buggy whereby the mounting of obstacles during forward travel of the bundle buggy is facilitated

* * * * *